United States Patent [19]

McMurtry

[11] Patent Number: 4,513,646
[45] Date of Patent: Apr. 30, 1985

[54] NUMERICALLY CONTROLLED MACHINE TOOL

[75] Inventor: David R. McMurtry, Wotton-under-Edge, England

[73] Assignee: Renishaw Electrical Limited, Wotton-under-Edge, England

[21] Appl. No.: 384,100

[22] Filed: Jun. 1, 1982

[30] Foreign Application Priority Data

Jun. 17, 1981 [GB] United Kingdom ............... 8118665

[51] Int. Cl.³ .................... B23B 1/00; B23B 25/06
[52] U.S. Cl. ........................... 82/1 C; 82/2 B; 318/39; 318/571
[58] Field of Search ............. 82/2 B, 1 C; 318/571, 318/39

[56] References Cited

U.S. PATENT DOCUMENTS

| | | | |
|---|---|---|---|
| 3,641,849 | 2/1972 | Kinney | 82/2 B |
| 3,727,493 | 4/1973 | Lahm | 82/2 B |
| 3,975,667 | 8/1976 | Bory et al. | 318/571 |
| 4,000,448 | 12/1976 | Shum et al. | 318/39 |

FOREIGN PATENT DOCUMENTS

| | | |
|---|---|---|
| 1198435 | 7/1970 | United Kingdom . |
| 1242760 | 8/1971 | United Kingdom . |
| 1362971 | 8/1974 | United Kingdom . |
| 1416190 | 12/1975 | United Kingdom . |
| 1436781 | 5/1976 | United Kingdom . |

Primary Examiner—Leonidas Vlachos
Attorney, Agent, or Firm—Spencer & Frank

[57] ABSTRACT

A numerically controlled machine tool comprises a tool movable into engagement with a workpiece, means for generating a first signal being a measure of the distance between the tool and a datum surface provided on a relatively fixed part of the machine, a first closed loop system adapted to move the tool toward the workpiece and having the first signal as feedback, means for generating a second signal being a measure of the distance between the tool and the workpiece, a second closed loop system (33) having the second signal as feedback, and means responsive to the second-mentioned distance attaining a threshold value, while being moved under the control of the first system, for changing control of the tool movement from the first to the second system.

5 Claims, 1 Drawing Figure

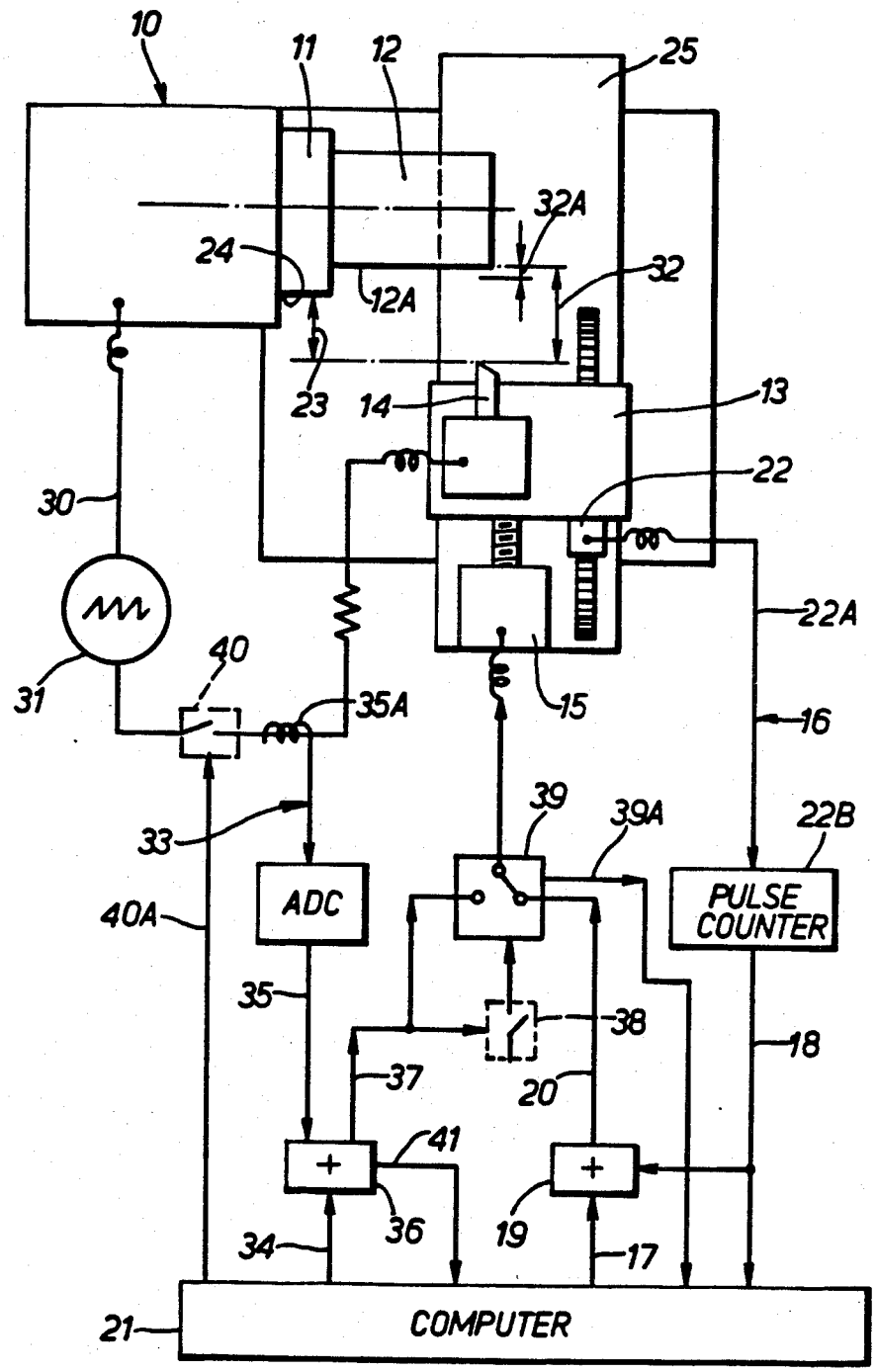

NUMERICALLY CONTROLLED MACHINE TOOL

BACKGROUND OF THE INVENTION

This invention relates to numerically controlled machine tools. It is known in such machine tools to move a tool into engagement with a workpiece under the control of a closed loop system having a feedback signal defining the distance between the tool and a datum surface provided on a fixed part of the machine.

It is the practice to move the tool initially at a relatively high speed so as not to waste time and to reduce that speed when the tool comes close to the workpiece so as to avoid undue impact forces between the tool and the workpiece. If the position of the tool surface to be engaged is not accurately known the speed change has to be made at a relatively early stage so that the time of a slow tool speed could be relatively long. It is an object of this invention to overcome or reduce this difficulty.

SUMMARY OF THE INVENTION

According to this invention there is provided a method of operating a machine having a tool to be moved into engagement with a workpiece, comprising the steps of moving the tool toward the workpiece under the control of a first closed loop system having a feedback signal defining a first distance being the distance between the tool and a datum surface provided on a fixed part of the machine, sensing a second distance being the distance between the tool and the workpiece and, responsive to the second distance attaining a threshold value, automatically discontinuing use of the first system and continuing moving the tool under the control of a second closed loop system having a feedback signal defining said second distance.

It will be seen that the second system determines the tool position by direct reference to the surface of the workpiece itself and can ensure a controlled approach to that surface even though the position of that surface is not, or is not accurately, known.

Also according to this invention there is provided a numerically controlled machine tool comprising a tool movable into engagement with a workpiece, means for generating a first signal being a measure of the distance between the tool and a datum surface provided on a fixed part of the machine, a first closed loop system adapted to move the tool toward the workpiece and having the first signal as feedback, means for generating a second signal being a measure of the distance between the tool and the workpiece, a second closed loop system having the second signal as feedback, and means reponsive to the second distance attaining a threshold value, while being moved under the control of the first system, for changing control of the tool movement from the first to the second system.

An example of apparatus according to this invention will now be described with reference to the diagram shown in the accompanying drawing.

DESCRIPTION OF A PREFERRED EMBODIMENT

A lathe 10 has a chuck 11 holding a workpiece 12 and further has a tool slide 13 supporting a tool 14 for machining the workpiece. The tool is moved toward the workpiece by a motor 15 acting on the slide 13 under the control of a first closed loop system 16 wherein a position demand signal 17 and a feedback signal 18 is fed to a summing junction 19 to produce an error signal 20 connected to drive the motor 15. The demand signal 17 is produced by a computer 21 and the feedback signal 18 is produced by a device 22, arranged between the slide and relatively fixed structure 25, for generating pulses 22A each defining a unit distance travelled. The pulses are counted by a counter 22B whose content is therefore a measure of total distance travelled and defines the signal 18.

As an initial datuming operation, which may be a manual operation, the counter 22B is set to zero while the tool 14 is engaged with a datum surface 24 defined on the chuck 11. The signal 18 is therefore a measure of the position of the tool 14 relative to the surface 24, this position being indicated by a distance 23.

Although the distance 23 is known by virtue of the signal 18, the distance, denoted 32, between the tool and workpiece is not known at this stage. The tool is intended to be driven into engagement with the workpiece for the purpose of measuring the dimension of a surface 12A of the workpiece contacted by the tip of the tool or for the purpose of a machining operation. In either case the fact that the position of the surface 12A is not known, or not known to the same accuracy, makes it difficult to drive the tool into engagement with the workpiece with speed and safety under the control of the system 16 alone.

To overcome or reduce that difficulty there is introduced an operation to sense the distance 32 between the tool and the surface 12A and in this context the tool 14 may be regarded as a probe for sensing the surface 12A. For the purpose of the sensing operation, the workpiece and the tool are connected in an electric circuit 30 fed by a generator 31 for producing a saw-tooth signal having a peak voltage such that current flow, in the form of a succession of sparks, is produced between the workpiece and the tool when the distance 32 therebetween is at a predetermined threshold value 32A. Since the mean current flow increases with a reduction in the distance 32 the circuit is a means of sensing the distance 32 between its threshold value and zero. At the threshold value the mean current flow is at a minimum and at zero, when the tool touches the workpiece, the mean current flow is at a maximum.

The circuit 30 is embodied in a second closed loop system 33 having a demand signal 34 corresponding to said maximum current flow and a feedback signal 35 of the actual mean current flow in the circuit. The signal 35 is derived from a current sensing element 35A. The signals 34,35 are connected to a summing junction 36 to produce an error signal 37 which is connected through a relay 38 to a switch 39 to change the error signal connection to the motor 15 from the signal 20 of the system 16 (this being the normal state of the switch 39) to the signal 37 of the system 33. It will be clear that instead of providing the separate summing junctions 19,36, a single summing junction may be provided and the switch 39 may be arranged to connect the signals 18,35 directly to such a single summing junction.

In a typical practical situation, the position of the tool is initially such that the distance 32 is greater than its threshold value 32A and the movement of the tool toward the workpiece is under the control of the system 16. When, during movement of the tool and progressive reduction of the distance 32, the latter distance attains the threshold value 32A, the control of the movement of the tool changes from the system 16 to the system 33, i.e. the tool continues to be moved under the control of the error signal 37 which progressively reduces as the signal 35 rises to the value of the signal 34. When the latter two signals are equal the signal 37 is zero and the tool stops at the point of contact with the surface 12A with an accuracy corresponding to the resolution of the system. The system 33 is arranged so that the speed of the motor 15 is slower than under the control of the system 16 and preferably so that the speed of the motor 15 progressively reduces towards the position at which the tool makes contact with the workpiece. Thus the movement of the tool under the control of the system 16 can be relatively rapid because the machine is safeguarded against damage by the system 33.

The device 22 continues operating during movement under the control of the system 33 so that the position of the tool 14 relative to the datum 24 continues to be available to the computer. The summing junction 36 is adapted to output a signal 41 indicative of the signals 34,35 being equal, i.e. the tool having made contact with the workpiece.

The signal 41 is connected to be read by the computer. If the contact between the tool and the workpiece is to be followed by a machining operation, the computer is programmed, on receipt of the signal 41, to return control of the tool movement to the system 16 and to proceed with the machining operation. If the contact between the tool and the workpiece is for the purpose of measuring the workpiece, the computer is programmed to store the signal 18 at the instant of the signal 41 thereby providing a record of the position of the surface 12A relative to the datum. Such a measuring operation may be programmed to occur prior to the machining operation to enable the program to determine the depth of cut appropriate to the machining operation. The system 33 may of course also be used for engaging the tool with the datum surface 24 for the purpose of the datuming operation.

However, the invention may be used solely for measuring the workpiece. In that case the computer is programmed to store the signal 18 at the instant of the signal 41 and thereafter to act on the system 16 to withdraw the tool from the surface 12A and move the tool to another surface to be measured on the workpiece. In this context the term "numerically controlled machine tool" is to be understood to include a numerically controlled coordinate measuring machine, and the term "tool" is, as already mentioned, to be understood to include a surface-sensing probe or probe member.

The computer is programmed to enable the circuit 30 by means of a signal 40A from the computer acting on a switch 40 in the circuit 30. This makes it possible to avoid unnecessary actuation of the system 33 e.g. between minor movements of the slide 13. Further, the computer is programmed to read the state of the switch 39 communicated to the computer by a signal 39A. This enables the program to initiate the next operation following contact between the tool and the workpiece.

In the example described the distance between the tool and workpiece is sensed by establishing a current flow therebetween. It will be understood that any other means of sensing may be employed e.g. a means for sensing a change of capacitance between the tool and the workpiece, or an optical means may be employed in which the distance is sensed e.g. by sensing a change in intensity or position of reflected light.

I claim:

1. A method of operating a machine tool whereby a tool and workpiece are moved into engagement with each other, said machine tool having a datum surface established on a part thereof, comprising the steps of moving said tool and said datum surface into engagement with each other;

separating said tool and said datum surface by a first distance;

generating a first feedback signal corresponding to said first distance;

moving said tool and said workpiece toward each other under the control of a first closed loop system in response to a first error signal corresponding to the difference between a first demand signal and said first feedback signal, the distance between said tool and said workpiece being defined as a second distance;

sensing when said tool and said workpiece are separated by a second distance equal to a predetermined threshold value;

generating a second feedback signal corresponding to said second distance; and switching control, in response to said second feedback signal, of the relative positions of said tool and said workpiece from said first closed loop system to a second closed loop system when said second distance is equal to said threshold value; and continuing to move said tool and said workpiece toward each other under the control of said second closed loop system in response to a second error signal corresponding to the difference between a second demand signal and said second feedback signal.

2. A numerically controlled machine tool including means for supporting a tool and a workpiece for relative movement therebetween, said machine tool having a datum surface established thereon, comprising motor means for moving said tool and workpiece relative to each other;

a first closed loop system including a first demand signal generating means and a first feedback signal generating means, said first feedback signal generating means generating a signal corresponding to the distance between said tool and said datum surface;

a second closed loop system including a second demand signal generating means and a second feedback signal generating means, said second feedback signal generating means generating a signal corresponding to the distance between said tool and said workpiece;

sensing means for determining when the distance between said tool and said workpiece has a predetermined value;

switching means for selectively coupling said first and second closed loop systems to said motor means, said switching means transferring actuation of said motor means from said first closed loop system to said second closed loop system when the signal generated by said second feedback signal generating means has a value corresponding to said predetermined threshold distance between said tool and said workpiece, said motor means being actuated by a first error signal corresponding to the difference between the signal generated by said first demand signal generating means and the signal generated by said first feedback signal generating means when said motor means is coupled by said switching means to said first closed loop system, and by a second error signal corresponding to the difference between the signal generated by said second demand signal generating means and the signal generated by said second feedback signal generating means when said motor means is coupled by said switching means to said second closed loop system.

3. A numerically controlled machine tool, comprising:
a workpiece holder for holding a workpiece;
a tool support for supporting a probe member;
drive means for positioning one of said workpiece holder and said tool support relative to a datum surface defined on the other;
closed loop means for controlling said drive means to effect said relative positioning;
first sensing means for sensing the relative positions of said workpiece holder and said tool support, said first sensing means generating a first feedback signal for actuating said closed loop means;
second sensing means connected to said probe member for sensing a surface of said workpiece when, during relative positioning of said probe member and said workpiece, the gap between said probe member and said workpiece is progressively reduced;
generating means for generating a second feedback signal for activating said closed loop system when said gap is reduced to a predetermined length;
switch means settable to first and second positions for connecting said first and second feedback signals respectively to said closed loop means; and
means for changing said switch means from said first position to said second position in response to said second feedback signal.

4. A numerically controlled machine tool according to claim 3, wherein said second sensing means comprises means for generating an electric potential between said probe member and said workpiece, said potential being sufficiently high to cause a flow of current across said gap at least when said gap has attained said predetermined length; and wherein said generating means comprises a circuit element responsive to said flow of current attaining a value corresponding to said gap of predetermined length, said generating means thereby generating said second feedback signal.

5. Machine tool according to claim 3 or claim 4 wherein said probe member comprises a cutting tool.

* * * * *